United States Patent [19]
Christenson

[11] Patent Number: 5,498,021
[45] Date of Patent: Mar. 12, 1996

[54] TAG AXLE MOUNTING SYSTEM

[75] Inventor: Ronald E. Christenson, Parsons, Tenn.

[73] Assignee: McNeilus Truck and Manufacturing Co., Dodge Center, Minn.

[21] Appl. No.: 405,798

[22] Filed: Mar. 16, 1995

[51] Int. Cl.⁶ .................................................. B60G 11/26
[52] U.S. Cl. ........................................ 280/704; 180/209
[58] Field of Search ................................. 280/704, 87.1; 180/209

[56] References Cited

U.S. PATENT DOCUMENTS

| | | | |
|---|---|---|---|
| 3,112,100 | 11/1963 | Prichard | 366/41 |
| 3,191,961 | 6/1965 | Brennan et al. | 280/81.1 |
| 3,191,963 | 6/1965 | Prichard | 280/81.1 |
| 3,246,884 | 4/1966 | Prichard et al. | 366/41 |
| 3,317,193 | 5/1967 | Buelow et al. | 366/68 |
| 3,633,879 | 1/1972 | Prichard | 366/68 |
| 3,838,885 | 10/1974 | Brennan et al. | 298/22 R |
| 3,985,036 | 10/1976 | Decker et al. | 74/96 |
| 4,032,116 | 6/1977 | Prichard | 366/26 |
| 4,063,779 | 12/1977 | Martin et al. | 298/22 P |
| 4,082,305 | 4/1978 | Allison et al. | 280/704 |
| 4,243,328 | 1/1981 | Prichard | 366/62 |
| 4,492,389 | 1/1985 | Wyatt et al. | 280/704 |
| 4,684,142 | 8/1987 | Christenson | 280/81.1 |
| 4,705,133 | 11/1987 | Christenson et al. | 180/209 |
| 4,762,421 | 8/1988 | Christenson et al. | 280/704 |
| 4,848,783 | 7/1989 | Christenson et al. | 280/405.1 |
| 5,018,755 | 5/1991 | McNeilus et al. | 280/704 |
| 5,067,740 | 11/1991 | Christenson | 280/407 |
| 5,149,126 | 9/1992 | Brennan | 280/704 |

Primary Examiner—Kenneth R. Rice
Attorney, Agent, or Firm—Haugen and Nikolai

[57] ABSTRACT

A dual attachment arm auxiliary or tag axle system for a work vehicle of the class including transit concrete mixer trucks utilizes an improved pivotal mounting system that is more rugged and dependable than previous systems and reduces associated pivot mount wear. The system uses a through-the-chassis member mounting which includes a spaced stabilizing arm to provide dual attachment for each arm and to prevent problems associated with a cantilevered arrangement. The improved mounting joints may take any of several forms. The through-the-chassis member configuration maximizes the distance behind the transit concrete mixing vehicle that the tag axle extends.

13 Claims, 4 Drawing Sheets

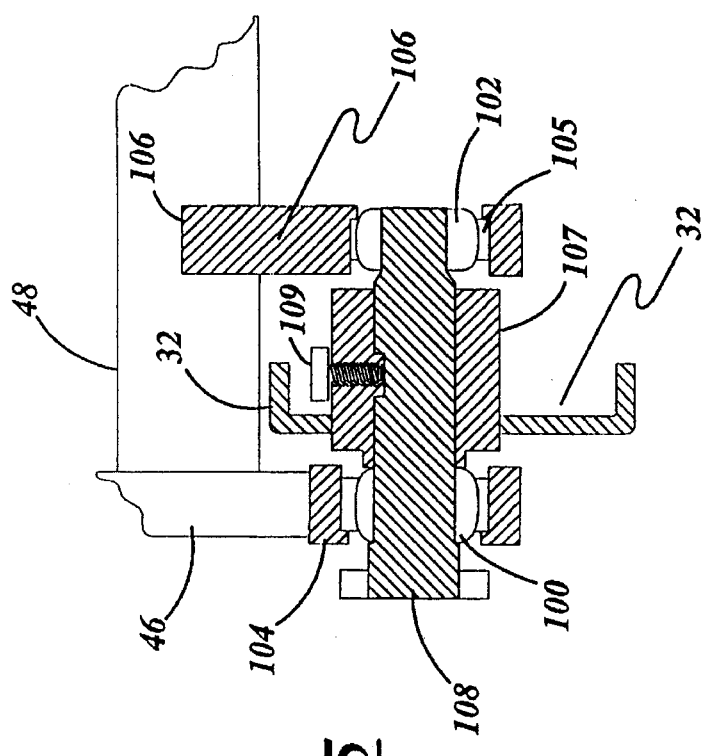
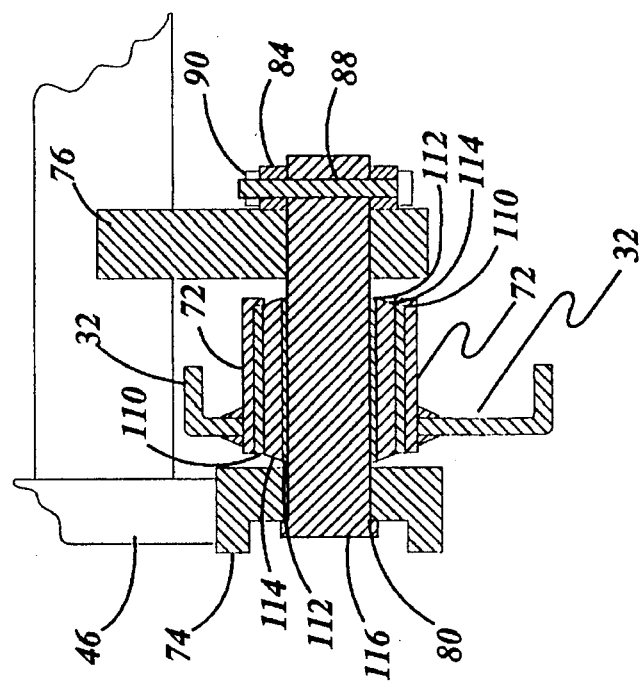

TAG AXLE MOUNTING SYSTEM

BACKGROUND OF THE INVENTION

I. Field of the Invention

The present invention relates generally to auxiliary or tag load supporting axles for wheeled vehicles of the utility, load-hauling type which can be selectively deployed into ground-engaging, load supporting disposition or retracted to an elevated or stowed position. The present invention is more specifically directed to an improved mounting and pivoting system for such auxiliary axle systems which is particularly adapted to be attached to the rear of a transit concrete mixing truck.

II. Related Art

Transit concrete mixing trucks typically include a cab for the operator and a rotatable drum behind the cab for containing and mixing of concrete ingredients. Such trucks further typically include a single set of forward steering wheels and a plurality of rear, load supporting drive axles carrying dual wheel arrangements all mounted on an elongated continuous chassis. For additional support, particularly in transit when the drum is substantially full, a mixing truck can benefit by having a pivotally mounted auxiliary axle able to operate between a raised position wherein it is carried by the truck and a lowered or deployed position wherein the auxiliary axle and its wheels share the truck's load with the permanent steering and drive wheel system.

Not only does the auxiliary or tag axle system assist in balancing the load carried by the transit cement truck when the drum is fully loaded, it may enable the cement truck to carry a higher total payload than would otherwise be permitted. This is because weight restrictions placed on vehicles traveling over highways by states and/or the federal government to prevent undue deterioration of highways and road surfaces are typically measured in terms of load per axle in combination with overall spacing between axles of a vehicle. By deploying an auxiliary or tag axle system, the number of axles as well as the spacing thereof can be temporarily increased when the truck is heavily loaded thereby enabling it to transport a higher total legal payload.

The related art is replete with numerous devices designed to achieve the foregoing end. Examples of such systems, particularly with regard to transit cement mixer vehicles, include U.S. Pat. No. 4,684,142 to Ronald E. Christenson, the inventor herein, and assigned to the same assignee as the present invention. That patent relates to a tag axle assembly and means for mounting it to a transit concrete mixing truck. The system is operable by a pair of pneumatic load springs extensible to pivot the assembly downward to operating position and a pair of pneumatic lift springs extensible to pivot the assembly upward to the raised or stowed position. The assembly includes a tag axle frame having a forward longitudinally extending stem and two rearward extending and diverging legs. The '142 system is particularly directed to improved tracking during turns and enabling adjustment to uneven terrain.

Another tag axle assembly for a work vehicle, particularly a transit cement mixing vehicle, is described in U.S. Pat. No. 4,848,783 to Ronald E. Christenson (the inventor herein) et al and assigned to the same assignee as the present invention. That invention is particularly concerned with a multi-hydraulic cylinder arrangement that enables the wheels to be raised a significantly greater distance above the ground than was previously the case. The '783 patent shows a cantilevered mounting system in FIG. 9. Because the pin is cantilever mounted, however, there is nothing to further stabilize the pin and it tends to wobble and cause undue wear of the mounting joint.

As illustrated by Brennan et al in U.S. Pat. No. 3,191,961, it is also known to mount bearing housings atop the chassis structural members or beneath the chassis structural members as shown generally in U.S. Pat. No. 3,112,100 to Prichard. These are mounted from the rear of transit concrete mixing vehicles. The spaced tag axle arms are carried by shafts or pivot pins journalled in these bearings.

Earlier devices have been satisfactory in many respects; however, one of the chronic shortcomings of many is related to the connection between the tag axle assembly and the rear of the vehicle. Many previous arrangements have experienced undue wear in connection with the pivoting points on which the tag axle assembly is mounted and about which it pivots for stowage and deployment.

It is therefore a principal object of the present invention to provide an improved articulating tag axle mounting assembly for a work vehicle.

Another object of the invention is to reduce wear in a tag axle assembly mounting system.

A further object of the invention is to provide a novel tag axle mounting assembly in which spaced sides of the assembly are pivoted each using a dual spherical bearing arrangement.

Still another object of the invention is to provide a novel tag axle mounting assembly in which the sides of the assembly are pivotally mounted each utilizing single spherical bearing arrangement in the mounting of the auxiliary axle to the truck frame.

Yet still another object of the invention is to provide a novel pivotal mounting assembly for a tag axle system wherein the tag axle system is pivotally mounted utilizing a pair of spaced elastomer filled journal bearing arrangements, one associated with each side of the system.

Still a further object of the invention is to provide a rugged, long-lasting deployable tag axle mounting assembly for a tag axle associated with a work vehicle such as a ready-mix concrete truck which either when stowed or fully extended is completely independent of and does not interfere with the chute used in unloading the vehicle.

A yet still further object of the invention is to provide an improved mounting assembly for a tag axle system for a transit concrete mixing vehicle that uses a stabilized bearing mount but does not diminish the interaxle distance.

These and other object and advantages of the invention will become apparent to those skilled in the art from the following detailed description of a plurality of embodiments, especially when considered in conjunction with the accompanying claims and drawings.

SUMMARY OF THE INVENTION

The foregoing and other objects of the invention are met by the provision of a novel auxiliary or tag axle system for a work vehicle of the class including transit cement mixer trucks which utilizes an improved pivotal mounting system that is more rugged and dependable than previous systems. It reduces associated pivot pin wear. In its preferred form, the tag axle system of the invention describes a generally rectangular shaped frame in which a pair of spaced parallel tag axle arms are connected by a pair of spaced transverse frame members which may be called an inner and an outer transverse frame member with respect to the distance from the pivot mount. The outer transverse frame member extends beyond the pair of spaced tag axle arms in both directions and carries a pair of spaced tag axle wheels mounted to the ends thereof using steerable king pin arrangements which are joined and aligned by a common tag axle steering linkage member. The spaced tag axle arms extend beyond the inner transverse frame member and are mounted on and journalled for rotation about a pair of spaced journal mounting assembles carried in openings in spaced longitudinal truck frame or chassis members. The tag axle assembly pivots about the pair of journal mounting assemblies during deployment and retraction or stowing and when the system is in the deployed truck supporting position, all the support forces and associated jars, and the like are transmitted through these pivotal joints.

The improved mounting joints of the invention may take any of several forms. In one embodiment, each of the spaced tag axle arms is provided with an end housing having a transverse opening. A pivot pin is mounted through the opening in the end housing of the arm and is journalled in a single spherical pivot bearing provided in a bearing housing carried in a mounting opening in each associated chassis structural member. Each pivot pin is further stabilized by being extended through and retained in an inner housing member or stabilizing member fixed to the inner transverse frame member spaced from and beyond the chassis member.

In an alternate embodiment, a dual pivot bearing arrangement is used to carry each of the spaced tag axle arms. Each arm is provided with an end bearing housing (outer) carrying an outer spherical bearing in which, at mounting, a tag axle pivot pin is journalled. An inner bearing housing or stabilizing member fixed to the inner transverse frame member is spaced inside each tag axle arm and carries a spherical bearing in which the inner end of the tag axle pivot pin is journalled. Each pivot pin extends through a pivot pin mounting housing welded to and traversing an opening in the main frame member which is located between the inner and outer bearing housings upon mounting. The central portion of the pivot pin is fixed to the mounting housing in the main chassis frame member as by a set screw, keying system or the like. Each arm of the tag axle system then is free to pivot vertically about a pair of spaced spherical bearings.

In still another embodiment, a journal bearing arrangement is associated with the mounting and pivoting of each of the spaced tag axle arms. In this embodiment, each tag axle arm is associated with a pivot pin mounted through an end housing in the axle arm, a truck frame or chassis longitudinal member and an inner housing member fixed to the inner transverse cross member beyond which it is retained. This portion of the arrangement is in the manner of the single spherical bearing arrangement. Instead of using a spherical bearing for a pivotal mounting between the truck frame or chassis member and the pivot pin, however, the bearing housing welded in the opening in the truck frame member is provided with a journal bearing system which employs concentric inner and outer tubular sleeves spaced by and fixed to a layer of an elastomer material therebetween in a sandwich construction. The pivot pin is mounted through the inner sleeve which acts as a journal or bushing type bearing which allows the tag axle pivot pin to rotate freely. A retainer bolt or cotter pin may be used to retain the tag axle pivot pin in the assembled state. Preferred elastomer materials include neoprene, polyurethane and polysiloxanes (silicon rubbers).

Any of the illustrated embodiments provide a sturdy mount for the tag axle system susceptible of a long life of trouble-free operation. The use of spherical bearings allows a certain degree of lateral pivotal adjustment in addition to straight vertical plane pivoting to further reduce wear on the system and particularly on the pivot pin. The steerable nature of the auxiliary tag wheels further alleviates stresses associated with sharp turns or in traversing rugged terrain. The open rectangular nature of the tag frame allows it to easily clear the concrete discharge chute when raised. Note that lower pivot point (through channel) mounting allows the tag axle to extend a greater distance beyond the rear of the truck thereby increasing axle span.

BRIEF DESCRIPTION OF THE DRAWINGS

In the drawings, wherein like numerals are used to designate like parts throughout the same:

FIG. 5 is an enlarged fragmentary detail view of an alternate embodiment using a dual pivot bearing system; and FIG. 6 is an enlarged fragmentary detail view of another embodiment using an elastomer supported journal sleeve or bushing-type bearing.

DETAILED DESCRIPTION

The present invention contemplates an auxiliary or tag axle system that is especially useful to provide additional support to the aft section of the chassis or frame of a transit concrete mixing vehicle that provides additional balance and support for a fully loaded vehicle especially during over the road travel. The system of mounting the auxiliary axle contains the invention and several embodiments implementing the invention are shown and described. These are meant to be exemplary rather than limiting with respect to others that may occur to those skilled in the art.

Figure 1:
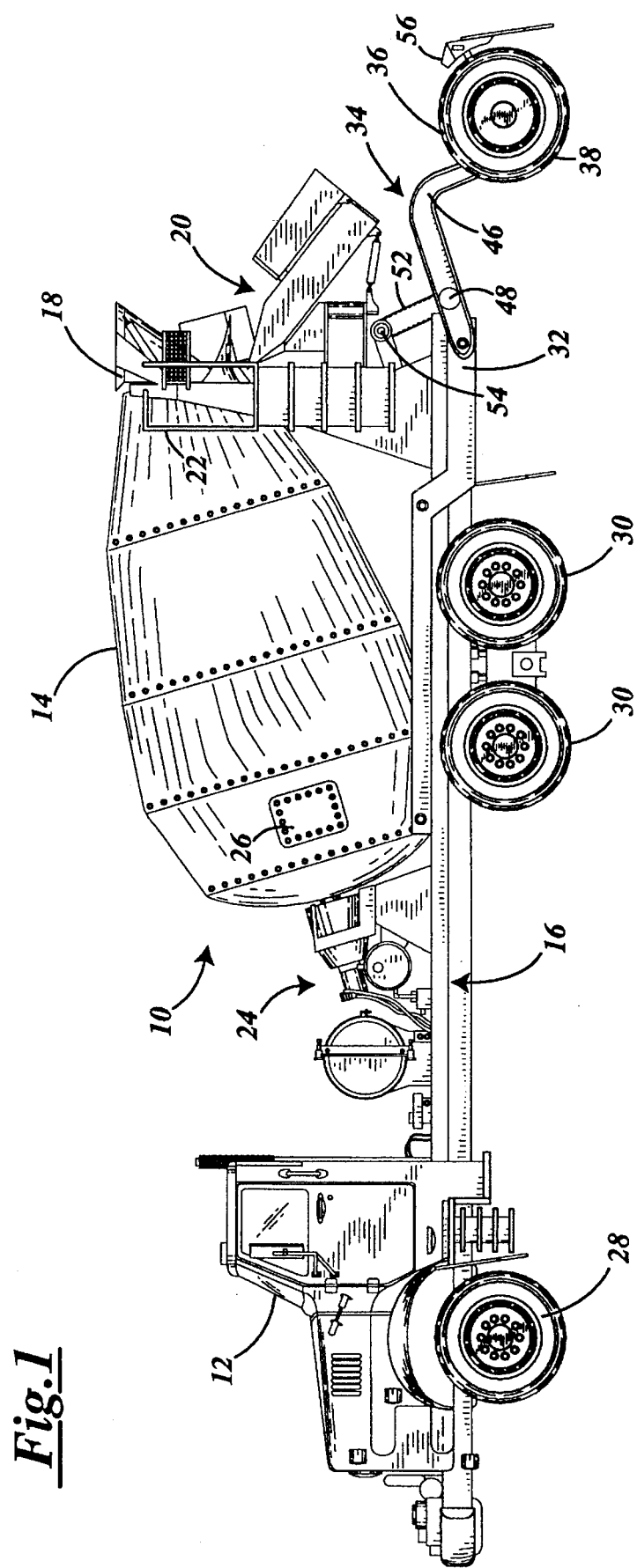
FIG. 1 is a side view of a transit concrete mixer vehicle with the tag axle system shown in the deployed or ground-engaging position.

FIG. 1 depicts a transit concrete mixing truck of the stretch variety 10 that includes a forward cab 12 and a rotatable mixing drum 14 mounted on a heavy truck chassis 16 and spaced behind the cab. The mixing drum is provided with a loading hopper 18 that facilitates the loading of cement, water and aggregate into the drum through an opening in the upper rear of the drum 14. mixed concrete is discharged through the rearward opening by reversing the rotation of the drum, the concrete placement being guided by a compound cylinder-operated chute system at 20. An access ladder 22 is provided to assist the operator in inspecting and cleaning the drum. The drum rotating mechanism is shown generally by 24 and an inspection hatch cover is depicted at 26.

The cab 12 and mixing drum 14 are supported by the chassis 16 which is, in turn, carried by a plurality of axle mounted wheels including a forward steering axle having a pair of wheels one of which is shown at 28 and a pair of load supporting axles 29 (FIG. 3) carrying sets of dual wheels as shown at 30 and 30a. The truck chassis or frame includes a pair of heavy spaced longitudinal structural members, normally channel shapes, such as depicted at 32 and 32a.

Figure 2:
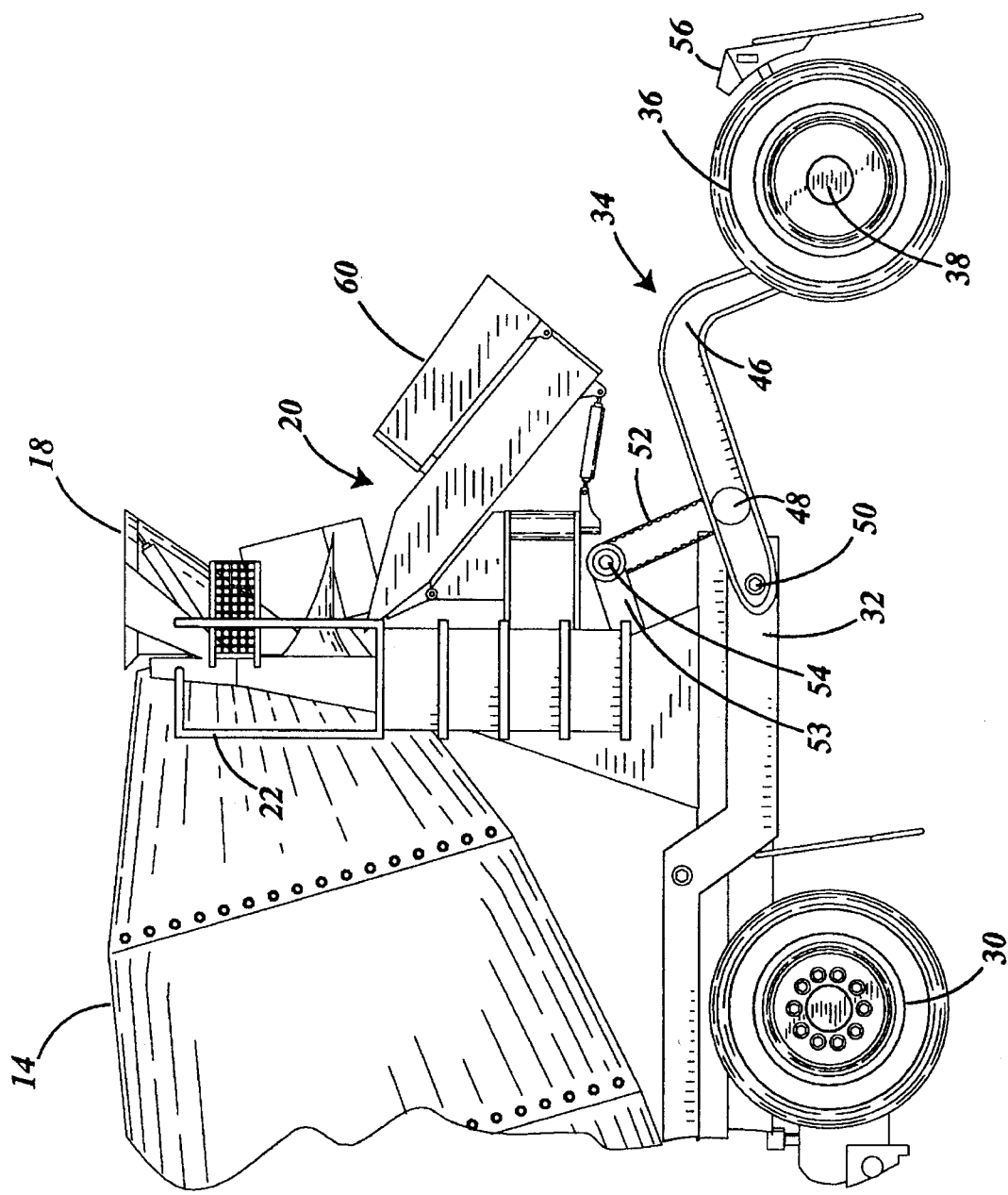
FIG. 2 is an enlarged partial side view of the concrete mixer vehicle of FIG. 1 that focuses on the tag axle area.
Figure 3:
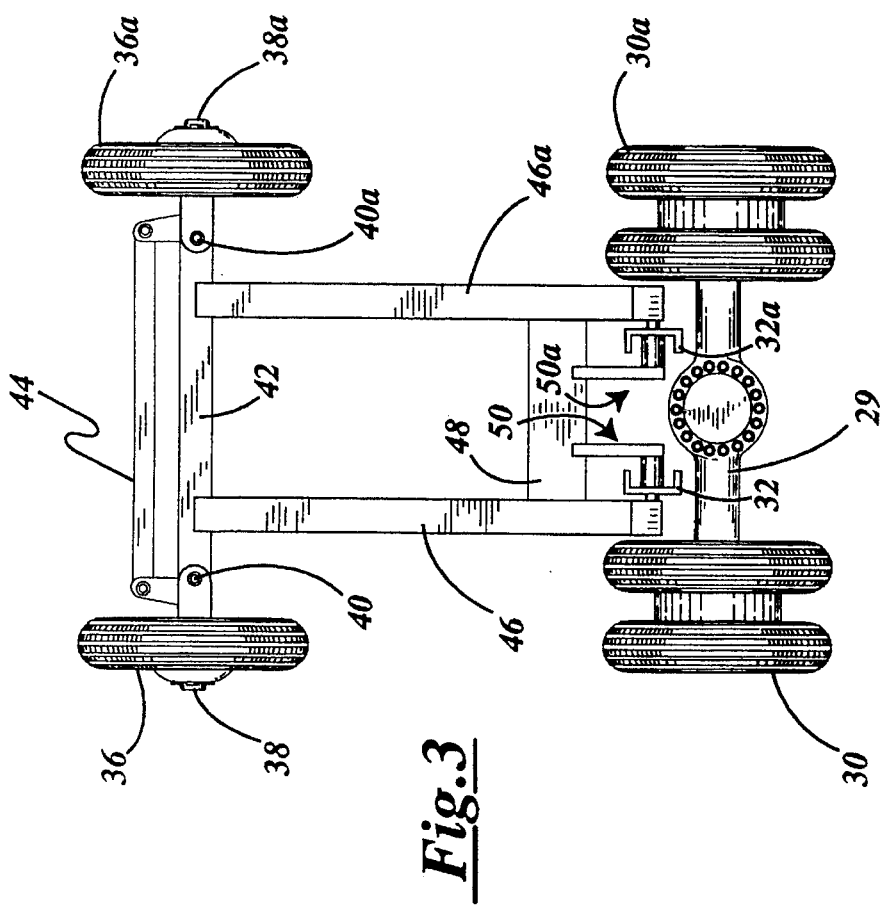
FIG. 3 is a view from behind the tag axle of the invention with the axle in the raised or stowed position.

The tag axle of the invention is depicted generally by the reference numeral 34 and also with particular reference to FIGS. 2 and 3 includes spaced tag wheels 36 and 36a mounted on stub axles 38 and 38a which, in turn, are freely steerably connected by king pins 40 and 40a to a common tag axle outer transverse frame member 42. A common tie rod 44 of a tag axle steering linkage maintains alignment of the tag wheels 36 and 36a.

The frame of the tag axle system of the invention also includes a pair of spaced tag axle arms 46 and 46a, each connected at one end to the outer frame member 42 and spanned near the other end by an inner transverse frame member 48, normally a heavy tubular member. Pivotal mounting assemblies generally at 50 and 50a pivotally connect tag axle arms 46 and 46a to the longitudinal chassis members 32 and 32a as will be described.

The tag axle system is deployed and stowed using a tag axle cylinder mounting lever 52 fixed to the tubular member 48 and operated by a fluid cylinder which is partially shown at 53. The cylinder is attached by a tag axle cylinder pivot mount as at 54 (FIGS. 1 and 2). A tag axle fender is depicted at 56.

Of course, FIGS. 1 and 2 show the tag axle assembly in its deployed or ground-engaging position while FIG. 3 is a rear view of the system in a raised or stowed orientation. Although not specifically shown in the Figures, the open frame construction enables the tag axle system to be stowed over and substantially in front of the movable discharge chute 60 of the chute system 20. Locating the tag wheels at a relatively long span behind the dual wheels 30 enhances the support and interaxle distance provided.

Of particular significance with respect to the invention are the mounting assemblies 50, 50a. These assemblies must carry all of the truck supporting forces yet allow easy vertical pivoting of the tag axle system for deployment or return to a stowed location. As described above, one prior system included bearings journalled in the spaced rails or channels with the tag axle arms cantilever mounted on pivot pins extending through each frame channel. The tag axle system was pivoted and rode on the pivot pins. However, the cantilevered pins tended to wobble and wear and became loose in the mount.

The improved mounts of the invention add stability and strength to bearing assemblies in a manner that greatly reduces wear. These will be discussed in conjunction with FIGS. 4–6. Each of the FIGS. 4–6 depict one embodiment of an assembly as at 50 in FIG. 3 with respect to a tag axle arm 46, it being understood that an identical mounting is symmetrically located with respect to tag axle arm 46a in an entire system.

Figure 4:
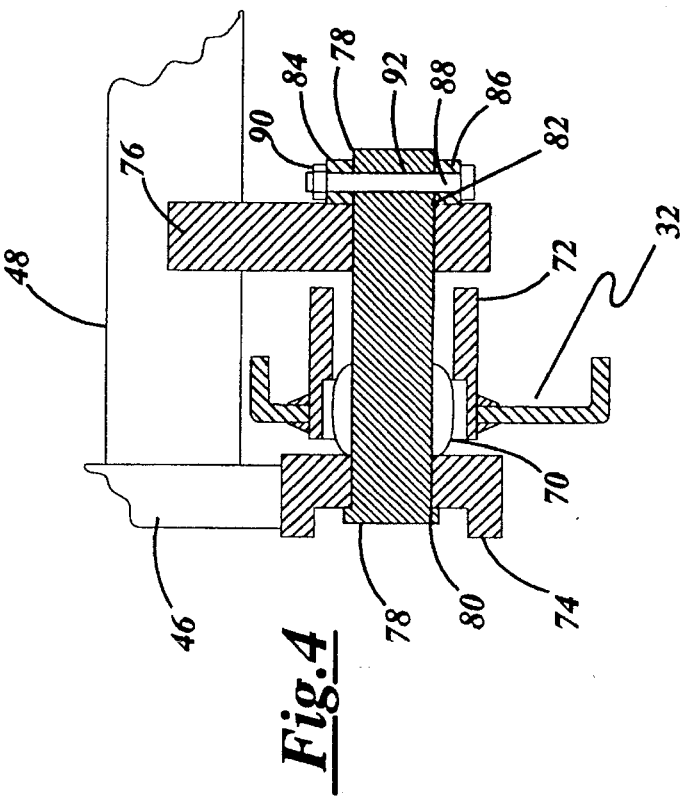
FIG. 4 is an enlarged fragmentary detail view of a single bearing embodiment of the mounting system of the invention.

FIG. 4 depicts a mounting assembly that includes a single spherical pivot bearing 70 mounted in a housing 72 fixed to a like opening in the truck frame channel 32. The tag axle arm 46 is provided with an end housing 74 and an inner housing or stabilizing arm 76 spaced from the arm 46 is provided fixed to a transverse frame member or cross tube 48. A tag axle pivot pin 78 is inserted through a matching machined opening in the end housing 74 and extended through the spherical pivot bearing 70 and through aligned matching machined opening 82 in inner housing 76 where it is fixed in place as by retaining ring 84 with bolt holes as at 86 and a retainer bolt with nut 90 which nests in a hole 92 in the pivot pin 78. Pivot pin 78 is freely rotatable in spherical bearing 70 to allow free pivoting of the tag arm 46 and the system is stabilized by the spaced inner housing or stabilizing arm 76. The slight amount of lateral and angular motion allowed by the spherical bearing also acts to reduce stress in the working system.

FIG. 5 illustrates an embodiment that employs a pair of spaced aligned spherical pivot bearings including an outer spherical pivot bearing 100 and an inner spherical pivot bearing 102, respectively, carried by an outer bearing housing 104 mounted on the end of tag axle arm 46 and an inner bearing housing opening 105 provided in inner arm 106. A pivot pin mounting housing 107 is fixed, as by welding, in a matching opening in the truck frame channel member 32. A pivot pin 108 is inserted through the aligned bearings 100 and 102 and is fixed with respect to mounting housing 107 as by set screw 109. Each side of the tag axle system pivots freely about the stationary pivot pin 108 using the pair of spaced bearings.

A third embodiment is shown in FIG. 6 which uses an inner arm stabilizing elastomeric supported journal or bushing-type bearing system to replace the single spherical pivot bearing in the embodiment of FIG. 4. The journalled system consists of a sandwich construction on which an outer sleeve 110 is molded into a concentric inner tube or sleeve 112 using an intermediate layer 114 of an elastomeric material such as neoprene, polyurethane or polysiloxanes. The inner tube 112 has a lubricous fit over a pivot pin 116 and when lubricated acts as a bushing type bearing similar to a babbitt metal bearing or the like. The outer tube 110 is press fit into the pivot bearing housing 72. This combination also provides a freely pivoting mounting support for the tag axle system which allows a slight amount of lateral and angular motion.

This invention has been described herein in considerable detail in order to comply with the Patent Statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

I claim:

1. An auxiliary axle system for mounting on a wheeled vehicle of interest comprising:

(a) an auxiliary axle frame including a pair of spaced parallel axle arms having inner and outer ends, said axle arms being connected by a pair of spaced parallel transverse frame members including an inner and an outer transverse frame member, said outer transverse member carrying a pair of spaced wheels mounted near the ends thereof, said inner transverse frame member being connected a distance from the inner ends of said axle arms, said axle arms having end housings with openings therein;

(b) a pair of inner stabilizing housing members fixed to said inner transverse frame member and spaced inward from said axle arms, each of said inner housing members having an opening aligned with and spaced from the opening in a corresponding one of said end housings of said axle arms;

(c) a pair of mounting pivot pin means each designed for insertion through the opening in an end housing of one of said axle arms and corresponding aligned opening in the adjacent inner stabilizing housing member each of said pivot pins being further designed to extend through a corresponding auxiliary axle mounting opening in a structural frame member of said vehicle of interest located between said axle arm and said inner stabilizing housing member for mounting said auxiliary axle system;

(d) bearing means allowing each of said axle arms to pivot relative to a corresponding one of said structural frame members of said vehicle of interest when said auxiliary axle system is mounted thereto.

2. The system of claim 1 wherein said bearing means comprises a single pivot bearing means placed in each said structural frame member of said vehicle of interest and said corresponding pivot pin mounted therethrough.

3. The system of claim 2 further comprising means for retaining said pivot pin.

4. The system of claim 3 wherein said pivot pin is provided with a transverse opening near the end thereof and wherein said means for retaining said pivot pin includes a retaining ring and bolt means extending through said retaining ring and engaging the opening in said pivot pin.

5. The system of claim 2 wherein each said bearing means comprises a spherical bearing.

6. The system of claim 1 wherein said bearing means associated with each said tag axle arm includes spaced outer and inner pivot bearings, said outer pivot bearing being mounted in said end housing of said axle arm and said inner pivot bearing being mounted in said inner housing; and wherein said tag axle pivot pin traverses and is journalled in said outer and inner pivot bearings when fixed in a mounting housing in said structural frame member of said vehicle of interest, said tag axle arms and inner bearing housings being free to rotate relative to the fixed pivot pin.

7. The system of claim 6 wherein each said bearing means comprises a spherical bearing.

8. The system of claim 1 wherein each said structural frame member of said vehicle of interest is provided with an elongated bushing-type journal bearing fixed in the opening therethrough and wherein said tag axle system is mounted by inserting said pivot pin through said tag axle arm end housing opening and said opening in said inner stabilizing housing and traversing said journal bearing therebetween.

9. The system of claim 8 further comprising means for retaining said pivot pin.

10. The system of claim 9 wherein said pivot pin is provided with a transverse opening near the end thereof and wherein said means for retaining said pivot pin includes a retaining ring and bolt means extending through said retaining ring and engaging the opening in said pivot pin.

11. The system of claim 8 wherein said bushing-type journal bearing includes an elastomeric cushion material sandwiched between inner and outer tubular sleeve members.

12. The system of claim 11 wherein elastomeric material is selected from the group consisting of neoprene, polyurethane and polysiloxanes.

13. The system of claim 12 wherein said elastomeric is neoprene.

* * * * *